(12) United States Patent
Benjey

(10) Patent No.: US 7,866,356 B2
(45) Date of Patent: Jan. 11, 2011

(54) ELECTRICALLY CONTROLLED REFUELING VAPOR VENT SHUTOFF

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 1092 days.

(21) Appl. No.: 11/592,642

(22) Filed: Nov. 3, 2006

(65) Prior Publication Data

US 2008/0105329 A1    May 8, 2008

(51) Int. Cl.
*B65B 1/30* (2006.01)
(52) U.S. Cl. .................. 141/198; 141/45; 141/50; 141/52; 141/301
(58) Field of Classification Search .......... 141/2, 141/44–47, 50, 52, 59, 290, 301, 302, 304, 141/307, 308, 94, 198
See application file for complete search history.

(56) References Cited

U.S. PATENT DOCUMENTS

| | | | |
|---|---|---|---|
| 5,944,076 A * | 8/1999 | Palvoelgyi | 141/348 |
| 6,176,259 B1 * | 1/2001 | Harde et al. | 137/587 |
| 6,854,492 B2 | 2/2005 | Benjey | |

* cited by examiner

*Primary Examiner*—Timothy L Maust
*Assistant Examiner*—Jason K Niesz
(74) *Attorney, Agent, or Firm*—Dykema Gossett PLLC

(57) ABSTRACT

A vapor emission control system includes an electrically operated shutoff valve in the fuel vapor vent recirculation line to the filler tube. The electrically operated valve is controlled by an electronic controller responsive to signals from a fuel level indicator and a fuel cap sensor in the tank. In one embodiment, the valve closes when the fuel level indicator indicates a full tank condition and when the fuel cap sensor indicates that the fuel cap is off the filler neck. The present invention thus provides a positive shutoff of fuel vapor to the filler tube during refueling.

12 Claims, 5 Drawing Sheets

ELECTRICALLY CONTROLLED REFUELING VAPOR VENT SHUTOFF

TECHNICAL FIELD

The present invention relates to fuel vapor venting during refueling of a motor vehicle fuel tank from a discharge nozzle placed into a tank filler tube of the type having a mechanical seal about the nozzle.

BACKGROUND OF THE INVENTION

Present fuel tank refueling nozzles commonly include a vacuum actuated device which shuts off the nozzle upon starvation of the vent vapor recirculation line thereby creating a vacuum in the filler tube around the nozzle.

Heretofore, in filler tubes not having a mechanical seal about the nozzle, the fuel tank vapor system provided for recirculation of the fuel vapor to the filler tube by connection to the vent line to the system vapor storage canister. In other known systems the system storage canister is connected to a separate vent tap through the top wall of the tank with a rollover valve for preventing spill leakage of fuel. The system employing the recirculation vent tap into the line to the canister must therefore rely upon the float operated fuel vapor vent valve in the tank to shut off the vent line when the fuel level has reached the top of the tank causing liquid to back up into the filler neck and shut off the nozzle. Such float operated vent valves are critical in their calibration in order to provide proper vapor venting as fuel is introduced into the tank and also must reliably close in the event of vehicle rollover. Heretofore, both of these latter requirements have been the source of problems in vehicle service for such float operated valves.

The type of system employing a vapor recirculation vent tube directly from the tank top to the upper end of the filler tube relies upon the liquid fuel covering the end of the tube through the top of the tank in order to starve vapor recirculation to the upper end of the filler tube thereby creating a vacuum for nozzle shutoff.

Referring to FIG. 4, a known system is illustrated wherein the fuel tank 1 has a float operated vent valve 2 mounted in the upper wall of the tank with the vent outlet thereof connected to the inlet of an electrically operated purge valve 3 which is controlled by an electronic controller or ECU 4. The outlet of the vent valve 2 is also connected to the inlet of a storage reservoir or canister 5. A recirculation port 6 in the upper end 7 of a filler tube 8 is provided for fuel vapor recirculation to the upper end of the filler tube during refueling by the nozzle discharging into the filler tube.

A recirculation vent line 10 is connected to the top of the tank to provide fuel vapor recirculation to the port 6 in the upper end of the fill tube 7 during refueling independently of the float operated vent valve 2 in which case a separate rollover spill protection valve 11 may be employed. In this latter arrangement the end of the tube extends through the upper tank wall to the desired level for having the liquid fuel close the end of the tube and terminate vapor recirculation to the fill tube end 7 when the fuel reaches a predetermined level. Typically, the recirculation line 10 must be routed along the top of the tank over the edge and along the filler to facilitate installation in the vehicle.

In the prior art system requiring a separate vent tube from the tank top to the upper filler neck, careful placement of the end of the vent tube in the tank is required to effect closing of the end of the vent tube at the desired fuel level in order to prevent liquid fuel backup in the filler tube. Furthermore, the routing of the recirculation line creates a liquid trap in the line, which can block recirculation and cause undesired vacuum in the filler tube during refueling and activation of the automatic nozzle shutoff.

Accordingly, it has been desired to provide a more positive way or means of cutting off vapor vent recirculation to the upper end of the filler tube during refueling when the liquid fuel level has risen to the desired full position.

BRIEF SUMMARY OF THE INVENTION

The present invention provides for an electrically operated shutoff valve in the fuel vapor vent recirculation line to the filler tube. The electrically operated valve is controlled by an electronic controller responsive to signals from a fuel level indicator and a fuel cap sensor in the tank. In one embodiment, the valve closes when the fuel level indicator indicates a full tank condition and when the fuel cap sensor indicates that the fuel cap is off the filler neck. The present invention thus provides a positive shutoff of fuel vapor to the filler tube during refueling.

DETAILED DESCRIPTION OF THE INVENTION

Figure 1:
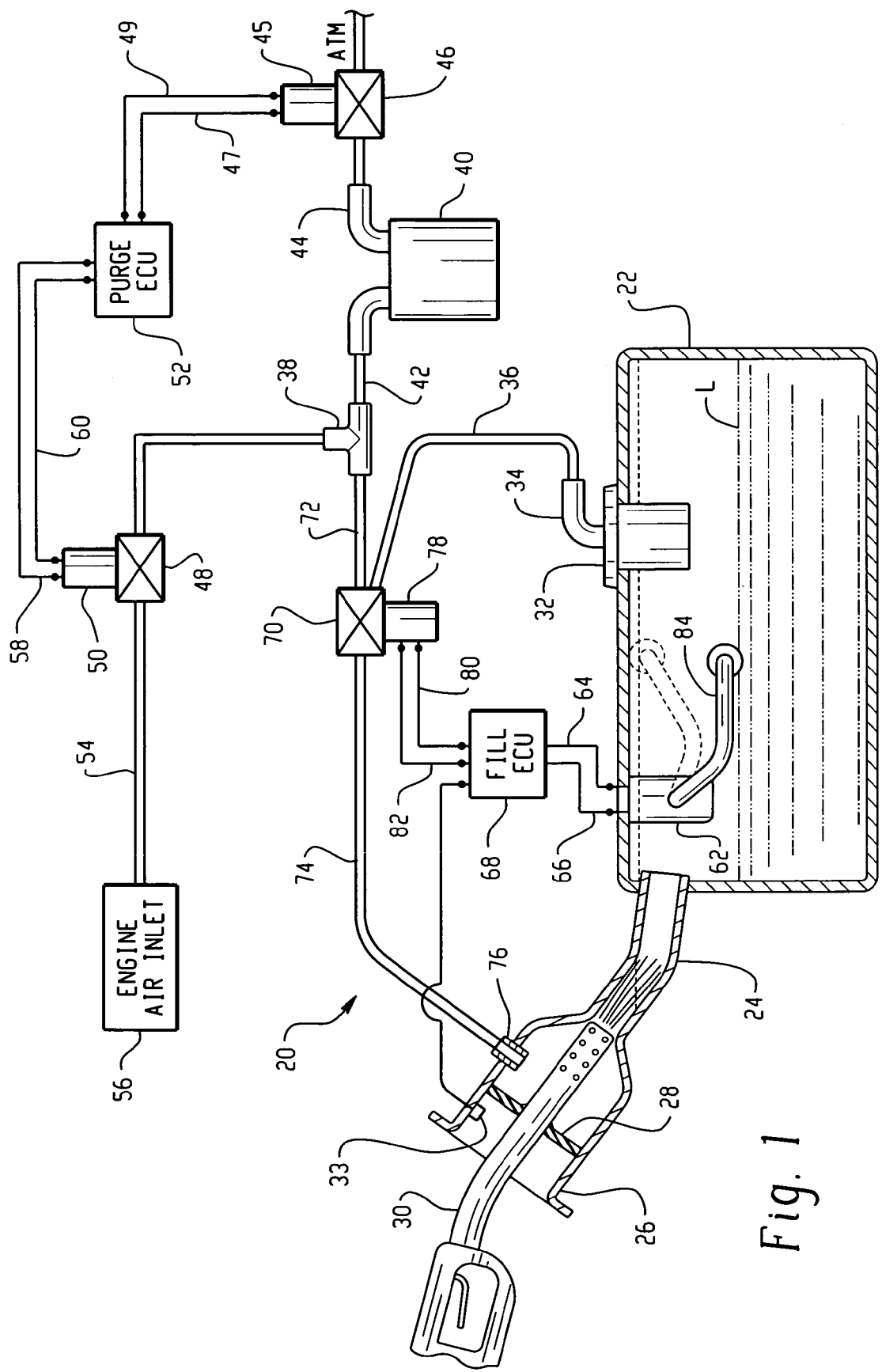
FIG. 1 is a pictorial schematic of a fuel tank vent system employing the present invention.

Referring to FIG. 1, the system of the present invention is indicated generally at 20 and is illustrated as connected to a vehicle fuel tank 22 having liquid fuel therein at a level L. A filler tube 24 is provided with its lower end connected through the wall of tank 22 and with its upper end 26 enlarged and having therein a flexible seal 28 for sealing about a refueling nozzle 30 such as the type having a vacuum operated shutoff (not shown) when same is received therein.

In the embodiment of FIG. 1 the tank has a float operated vapor vent valve 32 of the type well known in the art and attached through the upper wall of the tank with the outlet 34 thereof connected along line 36 to a vapor recirculation valve 70. A common manifold or connector 38 has one outlet connected through line 42 to the inlet of a storage reservoir or canister 40, which may be filled with adsorbent granulated carbonaceous material such as charcoal as is known in the art. Note that the vapor vent valve 32 may act as a rollover valve.

Canister 40 also is connected through an inlet fitting 44 to the outlet of valve 46 operated by solenoid 45, admitting atmospheric purge air upon a vacuum being drawn in the canister 40. The manifold or fitting 38 also has another outlet connected to the inlet of a purge flow control means, which in the present embodiment comprises valve 48 operated by a solenoid 50 controlled by an electronic controller or Purge ECU 52 for providing purge flow to its outlet and along line 54 to the air inlet of an engine denoted by reference numeral 56. Solenoid 50 is electrically connected by leads 58, 60 to the controller or purge ECU 52. It will be understood, however, that other flow control means may be employed, as for example, a pressure responsive valve or a pump or other flow control device. Atmospheric valve 46 has its actuating solenoid 45 connected by leads 47, 49 to ECU 52 which thus also controls flow of atmospheric air to the canister.

Figure 2:
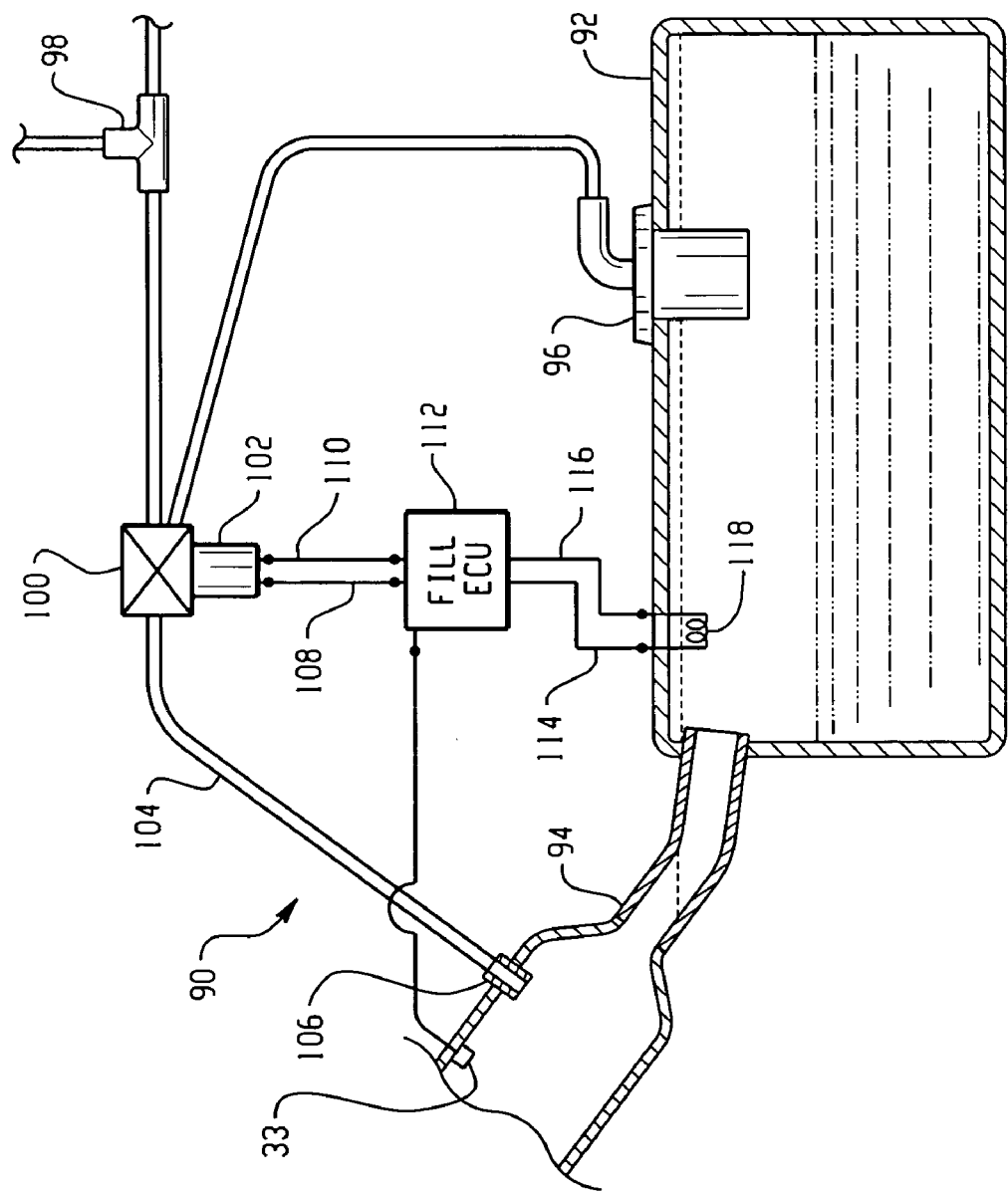
FIG. 2 is a view of a portion of the system of FIG. 1 showing an alternate embodiment of the present invention.

In the embodiment of FIG. 1, tank 22 has a float operated signaling device or sender 62 disposed therein which is connected by leads 64, 66 extending through the upper wall of the tank to an electronic controller or ECU 68. Note that other fuel level indicators can be used in place of the sender 62 without departing from the scope of the invention. For example, a thermal switch or thermistor (i.e., a positive temperature coefficient thermistor 118), as shown in FIG. 2, may be used to indicate that a desired fuel level has been reached in the tank.

The vapor recirculation valve 70 has its inlet connected to another outlet of manifold 38 along line 72; and, the outlet of valve 70 is connected through line 74 to the vapor recirculation port 76 provided in the upper end 26 of the filler tube below the seal 28. Valve 70 is actuated by a solenoid 78 connected by leads 80, 82 to receive a control signal from the Fill ECU 68. In one embodiment, the valve 70 is a normally-closed valve that is opened when the control signal from the ECU 68 energizes the solenoid 78 (i.e., closed under all conditions except refueling). High pressure conditions may also open the normally-closed valve 70 to relieve tank pressure.

Figure 5:
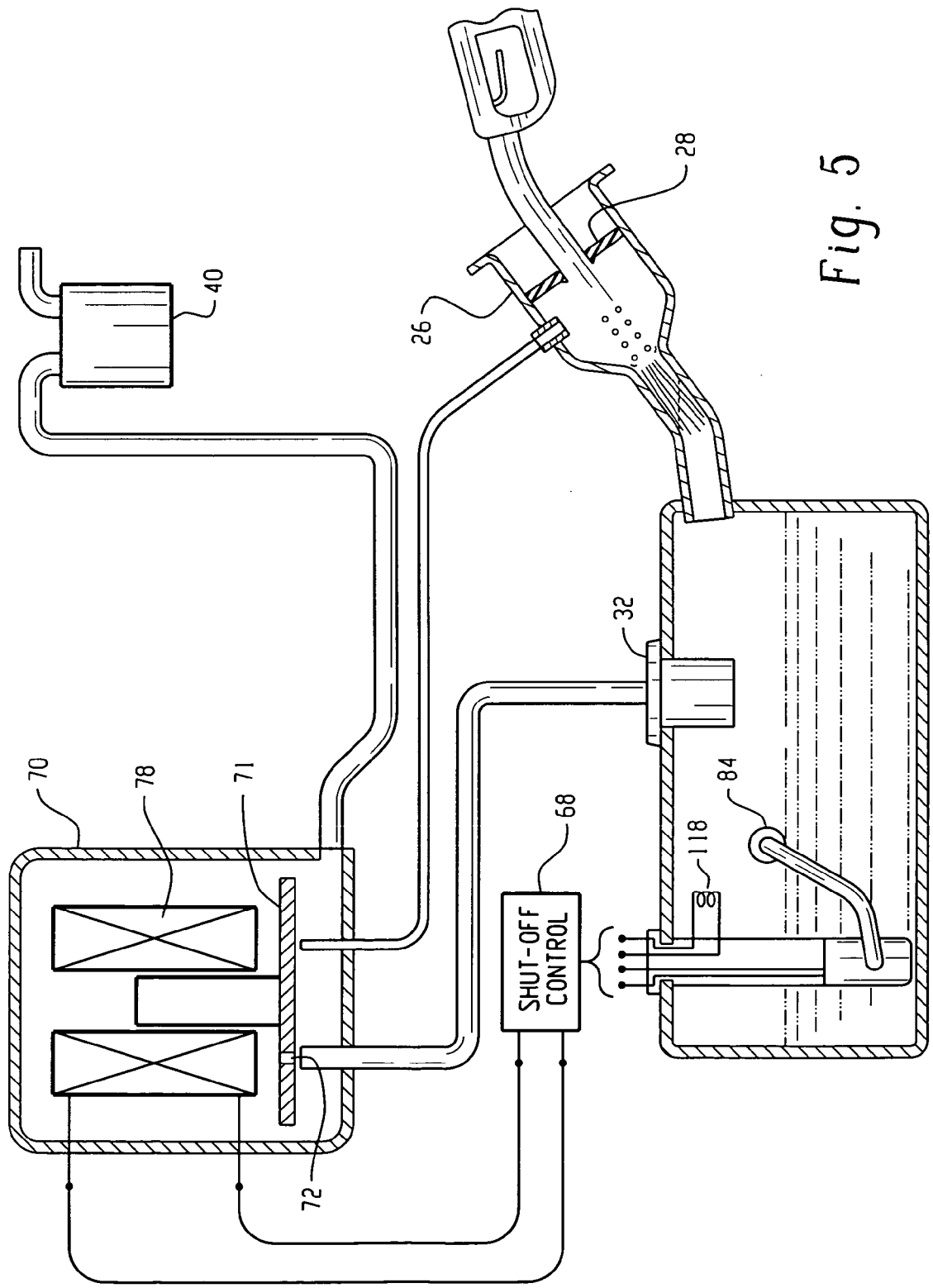
FIG. 5 is a schematic cutaway view showing the valve used in the inventive system in more detail.

FIG. 5 shows on possible embodiment of the valve 70 and the solenoid 78. As noted above, the valve 70 may be a normally-closed valve that opens when the solenoid 78 is energized. The valve 70 in this embodiment includes a seal 71 that can block vapor recirculation to the filler tube 26 and the path to the canister 40 at the same time. The seal 71 may include a control orifice 71 that allows a small amount of vapor to flow to the canister 40 when the valve 70 is closed.

In operation of the embodiment of FIG. 1, when the fuel level rises in the tank to the level indicated in dashed outline during refueling, the float arm 84 of sender 62 is raised causing the sender to send the signal to ECU 68 which de-energizes the solenoid 78 to close valve 70 and as shown in FIG. 1 block all further vapor recirculation to the upper end 26 of the filler tube. When the valve 70 is closed, continuing discharge of fuel from nozzle 30 creates a vacuum within the upper end of the filler tube 26 below the seal 28 and causes actuation of the unknown device in the nozzle 30 to cause automatic shut off. It will be understood that in the embodiment of FIG. 1, if the float operated vent valve 32 closes the vent line 36 before sender 62 sends a tank full signal to ECU 68, the vapor flow to the circulation line 74 and the canister line 42 will be shut off.

A cap sensor 33 disposed in the upper end 26 of the filler neck indicates whether the cap is on or off the filler neck. The sensor 33 can be any switch, such as a reed switch. The cap sensor 33 also sends a signal to the ECU 68 so that the ECU 68 energizes the solenoid 78 in the valve 70 when a fuel cap (not shown) is removed when the fuel level indicator shows that the tank is not full. This causes the valve 70 to open. When the tank is refueled to the full level, the ECU 68 de-energizes the solenoid 78 as explained above, closing the valve 70 and creating a vacuum in the filler neck 26 to induce nozzle shut-off.

Referring to FIG. 2, an alternate embodiment of the invention is indicated generally at 90 in which the tank 92 has a filler tube 94 with a float operated vent valve 96 connected to send vapor to a recirculation shutoff valve 100. A manifold 98 has one outlet connected to the inlet of a recirculation shutoff valve 100 operated by solenoid 102. The outlet of the valve 70 is connected along line 104 to the recirculation port 106 provided in the filler tube 94. The solenoid 102 is connected along lines 108, 110 to an electronic controller or fill ECU 112 which is connected along leads 114, 116 through the top of the tank 92 to a thermistor 118 disposed in the tank adjacent the undersurface of the tank upper wall.

In operation, the system 90 of FIG. 2 can shut off the flow of fuel vapor to the recirculation line 104 either by float operated vent valve 96 or by thermistor 118 sending a signal to ECU 112 which energizes solenoid 102 and closes valve 100 thereby blocking all recirculation of vapor to the filler tube upper end. It will be understood that the remainder of the system 90 of FIG. 2 although not illustrated as identical to that of the embodiment of FIG. 1.

Figure 3:
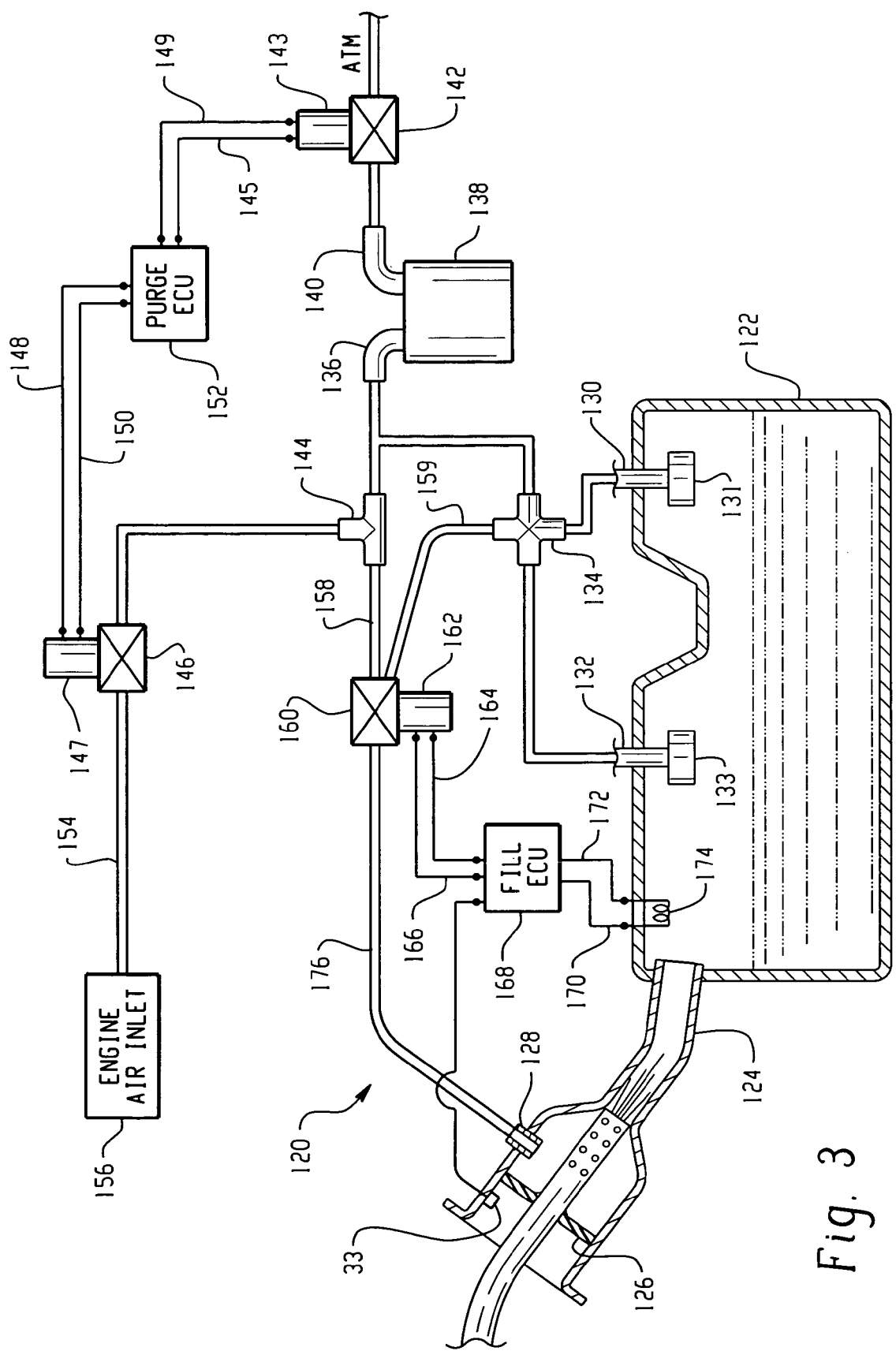
FIG. 3 is another embodiment of the present invention.
Figure 4:
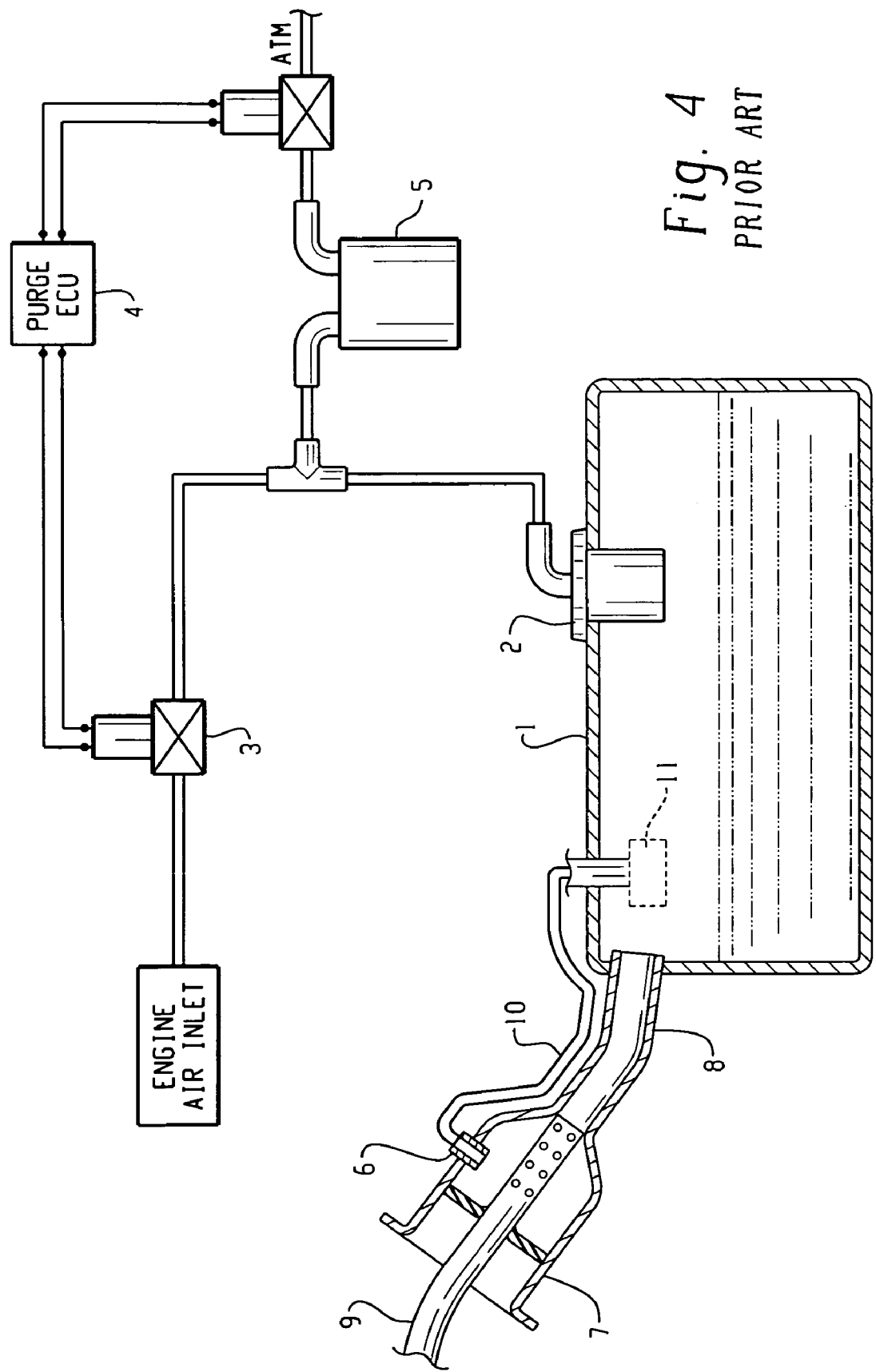
FIG. 4 is a schematic of the fuel vapor vent systems of the prior art.

Referring to FIG. 3, another embodiment of the invention is indicated generally at 120 wherein tank 122 has a filler tube 124 with the upper end thereof having a nozzle seal 126 therein and a vapor recirculation port 128. The upper wall of the tank is of the multilevel type employed for accommodating vehicle structural members and has separate vent tubes 130, 132 provided at the plurality of locations of the highest level or vapor domes. Tubes 130, 132 are connected to a manifold or connector 134 which is connected to the inlet 136 of a storage canister 138 with an atmospheric inlet 140 connected to a valve 142 operated by a solenoid 143 connected to ECU 152 by leads 145, 149. If desired or required rollover spill protection valves 131, 133 may be provided on the ends of tubes 130, 132 in the tank.

A tee 144 is connected to a solenoid operated purge valve 146 which has its solenoid 147 connected via leads 148, 150 to an electronic controller or purge ECU 152. The outlet of valve 146 is connected along line 154 to the air inlet 156 of the vehicle engine.

Tee 144 and connector 134 also provide a flow of fuel vapor along lines 158 and 159 to the inlet of a shutoff valve 160 operated by the solenoid 162 which is connected by leads 164, 166 to an electronic control unit or fill ECU 168. ECU 168 is connected by leads 170, 172 through the top wall of the tank to a thermistor 174 disposed within the tank and adjacent the upper wall thereof. The outlet of shutoff valve 160 is connected to the vapor recirculation port 128 in the upper end of the fill tube 124.

The system of FIG. 3 eliminates the need for a float operated vent valve and provides for vapor venting of the domes of the tank through the tubes 130, 132. The thermistor 174 senses the rising fuel level and signals ECU 168 to energize solenoid 166 and close shutoff valve 160 thereby stopping all recirculation of vapor through line 176, whereupon, nozzle discharge creates a vacuum within the upper end of the tube which automatically shuts off the nozzle.

The present invention thus provides an electrically operated valve for shutting off all flow of fuel vapor recirculated to the upper end of the filler tube for creating a vacuum to effect nozzle shutoff. The present invention can be utilized to provide an alternative or redundancy to a float operated fuel vapor vent valve in the tank or can be installed without the need for a float operated vent valve.

Although the invention has hereinabove been described with respect to the illustrated embodiments, it will be understood that the invention is capable of modification and variation and is limited only by the following claims.

What is claimed is:
1. A vapor emission control system for an engine fuel tank having a filler tube with an upper end for receiving a refueling nozzle comprising:
 a fuel level indicator in the tank operable to provide an electrical fill limit signal indicative of a predetermined level of fuel in the tank;
 a reservoir connected to receive fuel vapor from the tank;

a flexible seal disposed in the filler tube upper end for sealing about the nozzle when the nozzle is received therein;

a fuel cap sensor disposed in the filler tube and operable to provide a cap status signal indicating when a fuel cap is off the filler tube;

a fill controller operable to provide an electrical shut-off signal upon receipt of the electrical fill limit signal at the predetermined level and the cap status signal indicating that the cap is off the filler tube;

an electrically operated shut-off valve operatively connected for controlling vapor flow from the tank to the upper end of the filler tube and operative upon receipt of the shut-off signal for restricting vapor flow to the upper end of the filler tube to activate an automatic nozzle shut off, wherein the shut-off valve includes a seal having a control opening that allows restricted vapor flow between the fuel tank and the vapor storage device when the shut-off valve is closed.

2. The system defined in claim 1, wherein the fuel level indicator includes a float operated device.

3. The system defined in claim 1, wherein the fuel level indicator includes a thermistor.

4. The system defined in claim 1, wherein the shut-off valve is solenoid operated.

5. The system claimed in claim 4, wherein the shut-off valve is normally closed and wherein the shut-off valve closes when the solenoid is de-energized in response to the electrical shut-off signal indicating that the fuel level has reached the predetermined limit.

6. The system claimed in claim 5, wherein the fill controller energizes the solenoid to open the shut-off valve the when the cap status signal indicates that the fuel cap is off the filler tube and the fuel level is below the predetermined limit.

7. The system claimed in claim 1, wherein the fill controller opens the shut-off valve the when the cap status signal indicates that the fuel cap is off the filler tube and the fuel level is below the predetermined limit.

8. The system defined in claim 1, further comprising an electrically-operated purge valve that controls vapor flow from the reservoir to an air inlet of the engine.

9. The system defined in claim 8, further comprising an electronic purge controller operative to energize the purge valve in response to engine operating parameters.

10. A vapor emission control system for an engine fuel tank having a filler tube with an upper end for receiving a refueling nozzle comprising:

a fuel level indicator in the tank operable to provide an electrical fill limit signal indicative of a predetermined level of fuel in the tank;

a storage reservoir connected for receiving fuel vapor from the tank;

a fuel cap sensor disposed in the filler tube and operable to provide a cap status signal indicating when a fuel cap is off the filler tube;

a fill controller operable to provide an electrical shut off signal upon receipt of the electrical fill limit signal at the determined level and the cap status signal indicating that the cap is off the filler tube;

a solenoid-operated shut-off valve operatively connected for controlling vapor flow from the tank to the upper end of the filler tube and operative upon receipt of the shut-off signal for blocking vapor flow to the upper end of the filler tube, wherein the shut-off valve is normally closed and wherein the shut-off valve closes when the solenoid is de-energized in response to the electrical shut-off signal indicating that the fuel level has reached the predetermined limit, wherein the shut-off valve includes a seal having a control opening that allows restricted vapor flow between the fuel tank and the vapor storage device when the shut-off valve is closed, and wherein discharge from the nozzle creates a vacuum in the upper end thereby activating an automatic nozzle shut off.

11. The system claimed in claim 10, wherein the fill controller energizes the solenoid to open the shut-off valve the when the cap status signal indicates that the fuel cap is off the filler tube and the fuel level is below the predetermined limit.

12. The system claimed in claim 10, wherein the fill controller opens the shut-off valve the when the cap status signal indicates that the fuel cap is off the filler tube and the fuel level is below the predetermined limit.

* * * * *